United States Patent [19]
Hoffman et al.

[11] Patent Number: 5,947,062
[45] Date of Patent: Sep. 7, 1999

[54] RESTRAINT SYSTEM FOR AN ANIMAL AND METHOD OF OPERATING SAME

[76] Inventors: Michael C. Hoffman, 3915 Crooks Rd., Royal Oak, Mich. 48073; E. Eric Hoffman, 1010 Megan Rd, Livermore, Calif. 94550

[21] Appl. No.: 09/034,725

[22] Filed: Mar. 4, 1998

[51] Int. Cl.$^6$ .................................................. A01K 27/00
[52] U.S. Cl. ............................................................ 119/769
[58] Field of Search ................................. 119/769, 792, 119/793, 795, 798

[56] References Cited

U.S. PATENT DOCUMENTS

| | | | |
|---|---|---|---|
| 4,584,967 | 4/1986 | Taplin | 119/793 |
| 5,099,799 | 3/1992 | Giacobbe | 119/793 |
| 5,379,726 | 1/1995 | Mann | 119/793 |
| 5,497,733 | 3/1996 | Hull et al. | 119/793 |

*Primary Examiner*—Thomas Price
*Attorney, Agent, or Firm*—The Law Offices of Bever & Hoffman, LLP

[57] ABSTRACT

A restraint system which can remain on an animal at all times. In one embodiment, the restraint system includes a strap which serves as both a collar and a leash. The restraint system can be in either an extended state or a retracted state. In the extended state, the collar portion is positioned around the animal's neck and the leash portion extends from the collar portion to the animal owner's hand. In the retracted state, the entire restraint system is stored around the animal's neck by reversibly attaching the leash portion to the collar portion, as well as to the leash portion itself, in an overlapping spiral configuration. VELCRO™ strips can be used to reversibly attach the leash and collar portions. Another embodiment of the invention includes a restraint system which includes a collar assembly coupled to a leash assembly. The collar assembly and the leash assembly are made from separate straps and are attached to each other by a connecting element. The connecting element can be, for example, a restraining ring, a rivet or thread (in which case the collar assembly is fixedly attached to the leash assembly), or a clasp (in which case the collar assembly is reversibly attached to the leash assembly). Both the collar assembly and the leash assembly include VELCRO™ strips which enable the leash assembly to be held to the collar assembly (and itself) when the leash assembly is wrapped around the collar assembly in an overlapping spiral configuration.

7 Claims, 6 Drawing Sheets

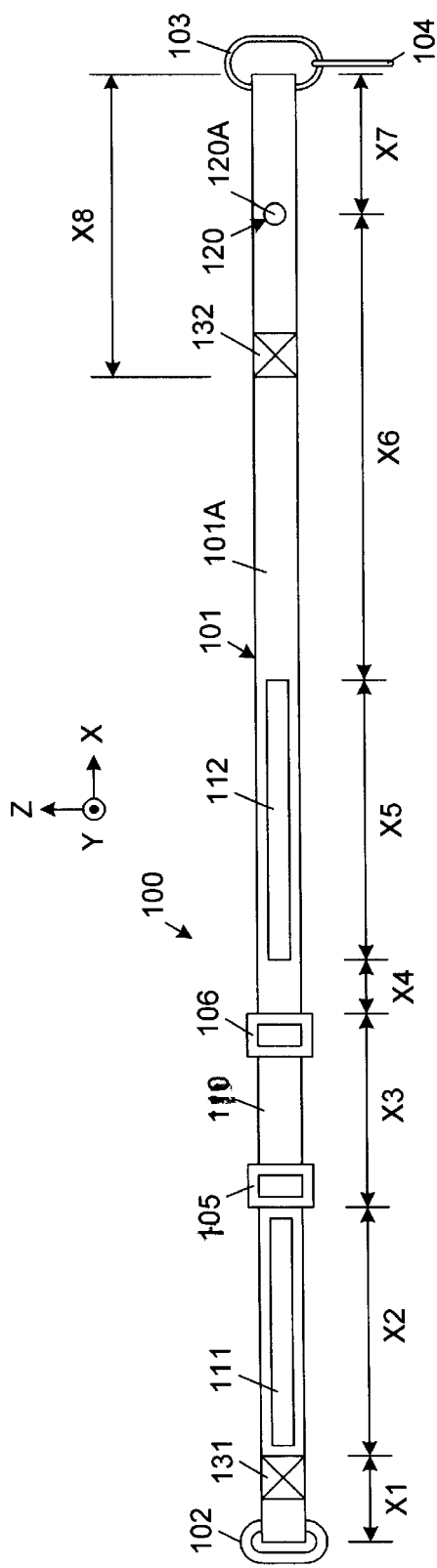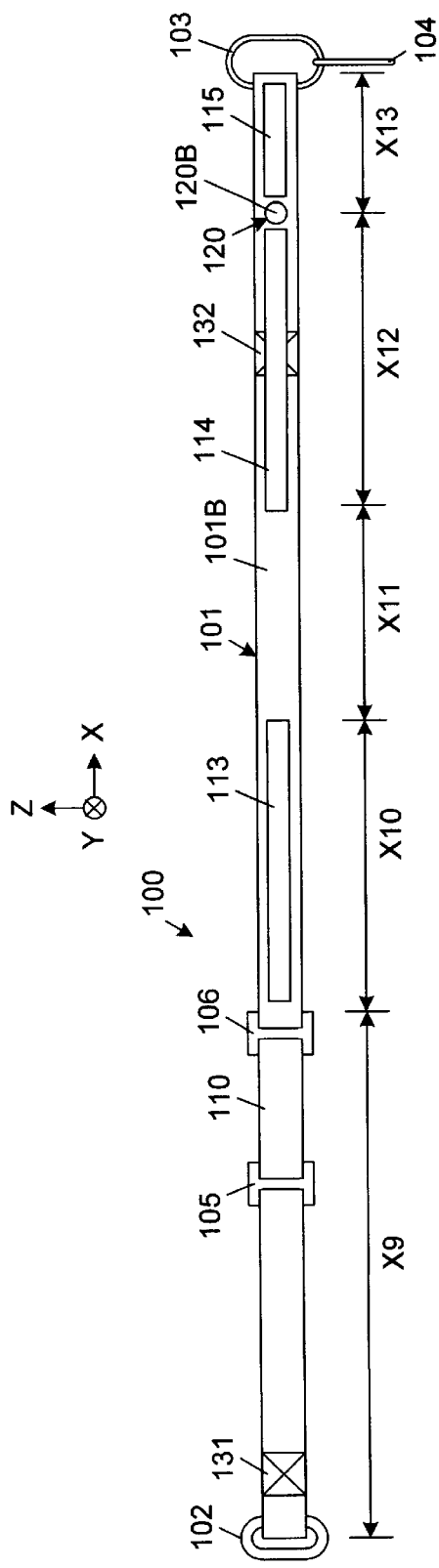

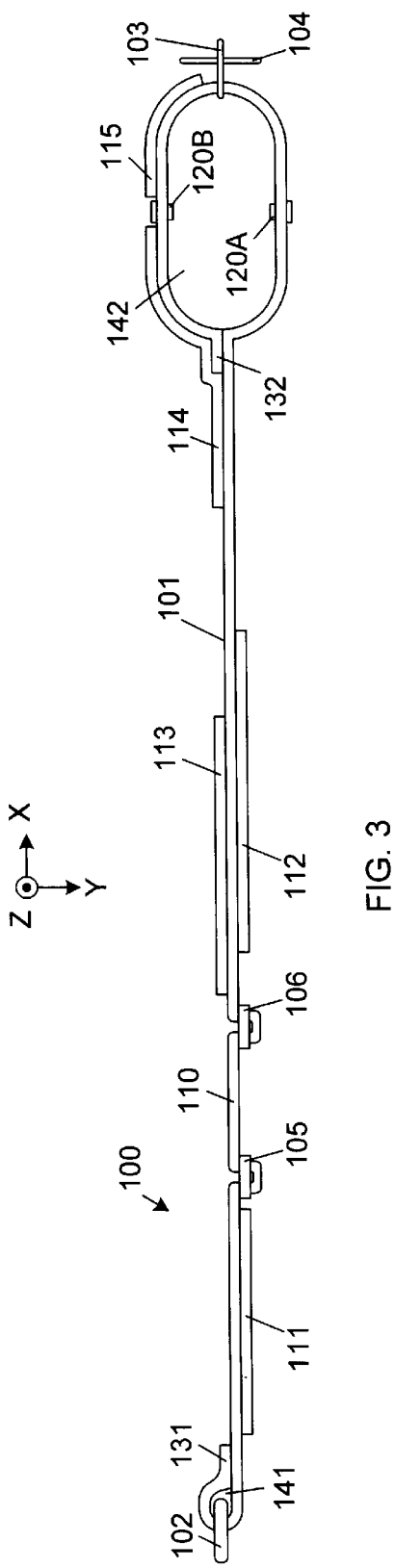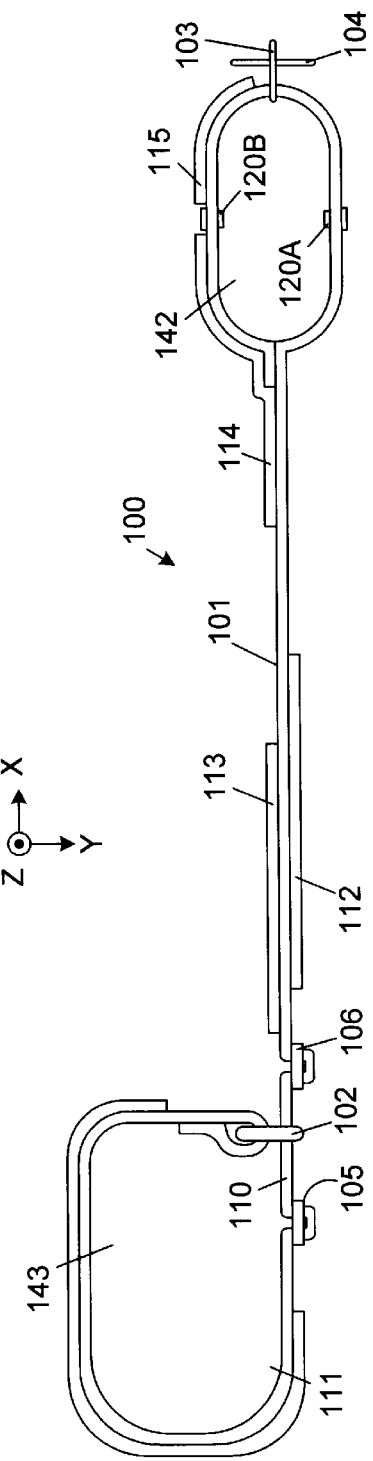

RESTRAINT SYSTEM FOR AN ANIMAL AND METHOD OF OPERATING SAME

BACKGROUND OF THE INVENTION

1. Field of the Invention

The present invention relates to a method and apparatus for restraining an animal. More specifically, the present invention relates to an integrated restraint system for an animal and a method of operating the same.

2. Description of the Prior Art

Conventional devices for restraining animals, such as dogs, include collars (which wrap around the animal's neck) and body harnesses (which wrap around the animal's body). These devices are not fully functional without the attachment of a separate leash. The leash must be attached to the collar or body harness to enable the animal owner to restrain the animal.

The leash is typically removed from the collar or body harness and stored at a remote location when not in use. Consequently, the animal owner must keep track of the particular location where the leash is stored. If the owner fails to remember this location, and cannot find the leash, the restraint system is rendered ineffective. Moreover, the animal owner must walk to the location where the leash is stored in order to retrieve the leash each time the leash is used. This can be an inconvenience for the animal owner.

It would therefore be desirable to have a restraint system which may remain on the animal at all times, thereby eliminating the previously described disadvantages of prior art restraint systems.

SUMMARY

Accordingly, the present invention provides a restraint system which remains on the animal at all times. In one embodiment, the restraint system includes a strap which serves as both a collar and a leash. The restraint system can be in either an extended state or a retracted state. In the extended state, the collar portion is positioned around the animal's neck and the leash portion extends from the collar portion to the animal owner's hand. In the retracted state, the entire restraint system is stored around the animal's neck by reversibly attaching the leash portion to the collar portion, as well as to the leash portion itself, in an overlapping spiral configuration.

In a particular embodiment of the invention, the restraint system includes a strap having a first end and a second end and first and second opposing surfaces. A restraining ring is attached at the first end of the strap. The restraining ring is further located over the strap to form a collar loop for receiving the neck of the animal. VELCRO™ strips are located on the first and second opposing surfaces of the strap such that these VELCRO™ strips engage with one another when the strap is wrapped around itself in an overlapping spiral configuration. As a result, the leash portion is held on the collar portion (and itself) in a retracted state when the restraint system is not in use.

In a particular embodiment, a handle loop is formed at the second end of the strap. The handle loop is dimensioned to receive a user's hand. A snap element is provided for holding the handle loop in a closed configuration when the restraint system is in the retracted state.

In another embodiment, stoppers are located on the strap for limiting the movement of the restraining ring along the strap. As a result, the collar loop cannot become so small as to choke the animal, or become so large as to allow the collar to slip over the animal's head. The stoppers can be adjustable along the strap, thereby allowing the restraint system to be used on animals having different sized necks.

Another embodiment of the invention includes a restraint system which includes a collar assembly coupled to a leash assembly. The collar assembly and the leash assembly are made from separate straps and are attached to each other by a connecting element. The connecting element can be, for example, a restraining ring, a rivet or thread (in which case the collar assembly is permanently attached to the leash assembly), or a clasp (in which case the collar assembly is reversibly attached to the leash assembly). Both the collar assembly and the leash assembly include VELCRO™ strips which enable the leash assembly to be held to the collar assembly (and itself) when the leash assembly is wrapped around the collar assembly in an overlapping spiral configuration.

The present invention also includes a method for restraining an animal which includes the steps of: (1) providing a collar loop with an attached leash, (2) locating the collar loop around the animal's neck, (3) controlling the leash to restrain the animal, and (4) reversibly attaching the leash to the collar loop (and to the leash itself) in an overlapping spiral configuration, thereby storing the collar loop and leash around the animal's neck when not restraining the animal.

This invention will be more fully understood in light of the following drawings taken together with the detailed description.

BRIEF DESCRIPTION OF THE DRAWINGS

FIG. 1 is a first side view of a partially assembled restraint system in accordance with one embodiment of the invention;

FIG. 2 is a second side view of the restraint system of FIG. 1;

FIG. 3 is a top view of the restraint system of FIG. 1;

FIG. 5 is a top view of the restraint system of FIG. 1, after assembly, in an extended state;

DETAILED DESCRIPTION

Figure 4A:
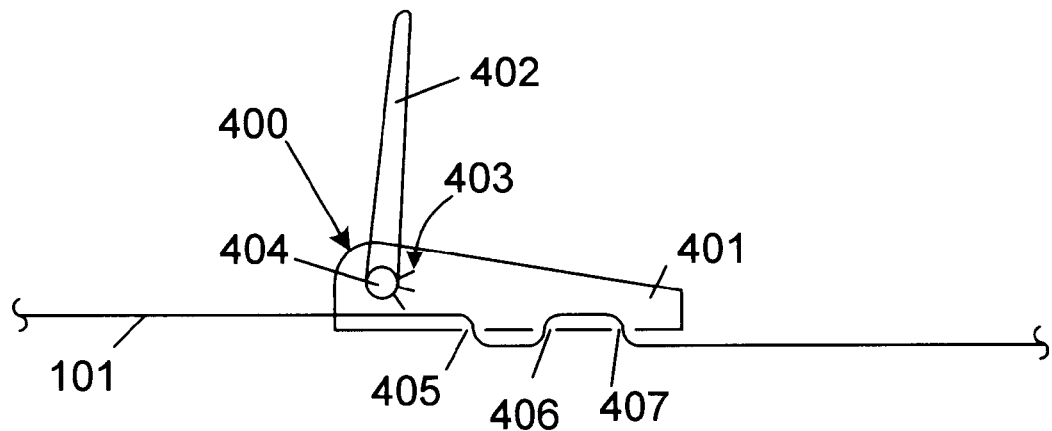
FIGS. 4A and 4B are schematic side views of a stopper in open and closed positions, respectively, in accordance with another embodiment of the invention.

FIGS. 1 and 2 are opposing side views of a partially assembled restraint system 100 in accordance with one embodiment of the present invention. FIG. 3 is a top view of the partially assembled restraint system 100. FIGS. 1, 2 and 3 are illustrated using an X–Y–Z coordinate system as illustrated. Restraint system 100 includes a strap 101, a restraining ring 102, an identification tag ring 103, an identification tag 104, adjustable stoppers 105–106, VELCRO™ strips 111–115, and snap 120.

Strap 101 has a first surface 101A (FIG. 1) and an opposing second surface 101B (FIG. 2). In the described embodiment, strap 101 is a nylon strap having a thickness along the Y-axis of approximately 1/16 inch, a width along the Z-axis of approximately 1 inch, and a length along the X-axis of approximately 64.5 inches. The described strap 101 is illustrative, but not limiting. For example, strap 101 can be made of other materials. However, the material used for strap 101 should have a sufficient strength to restrain the animal wearing the restraint system 100. Strap 101 can alternatively have other dimensions, which are varied based on the size of the animal being restrained.

A first end of strap 101 is looped through the oblong restraining ring 102. Strap 101 is secured to itself by strap fastener 131, thereby forming a loop 141 which retains restraining ring 102 at the first end of strap 101 (See, FIG. 3). In the described embodiment, loop 141 has a length X1 of approximately 1.5 inches along the X-axis. In the described embodiment, strap fastener 131 is nylon thread, which is used to sew the strap 101 over on itself. Other fasteners, such as rivets, can be used and are considered to be within the scope of the invention.

Restraining ring 102 is, for example, metal, plastic or any other material capable of withstanding the forces required to restrain the animal. Restraining ring 102 is dimensioned to closely fit over strap 101. In the described embodiment, the dimensions of the opening in restraining ring 102 are 1 inch along the Z-axis, ½ inch along the X-axis and ⅛ inch along the Y-axis.

The second end of strap 101 is fashioned to form a handle loop 142 which is sized to allow the animal owner to insert his or her hand into this loop 142 (See, FIG. 3). In the described embodiment, handle loop 142 has a length X8 of approximately 7 inches along the X-axis. Handle loop 142 is formed by using a strap fastener 132 to secure the second end of strap 101 to the main body of strap 101 as illustrated. In the described example, strap fastener 132 is nylon thread, which is used to sew strap 101 over on itself. However, other strap fasteners, such as rivets, may be used in other embodiments. In another embodiment, handle loop 142 is not formed, and the second end of strap 101 is left unattached. In this embodiment, the animal owner can secure the strap by wrapping the second end of strap 101 around his or her hand.

Strap 101 extends through identification tag ring 103, thereby securing tag ring 103 on handle loop 142. Tag ring 103 can be located on strap 101 either before or after handle loop 142 is formed. Tag ring 103 provides a structure which facilitates the attachment of animal identification tag 104. Tag ring 103 is made of metal, plastic or another material capable of retaining animal identification tag 104. As described in more detail below, tag ring 103 and identification tag 104 hang from the animal's neck when the restraint system 100 is in a retracted state.

Snap 120 includes a first snap element 120A and a second snap element 120B, both of which are attached to handle loop 142 as illustrated. Snap elements 120A and 120B are located at a distance X7 of 2.5 inches from the end of the mid-point of handle loop 142. Snap elements 120A and 120B can be de-coupled, thereby opening handle loop 142 such that the user can insert a hand into this loop 142. Alternatively, snap elements 120A and 120B can be snapped together, thereby holding handle loop 142 in a closed position. As described in more detail below, handle loop 142 is held in the closed position when the restraint system 100 is in a retracted state.

In another embodiment, snap 120 can be replaced with VELCRO™ strips located on the interior surface of handle loop 142. These VELCRO™ strips are of different types (i.e., hooks and loops), such that handle loop 142 is held in a closed position when the VELCRO™ strips are pressed into contact with one another. In yet another embodiment, snap 120 can be replaced with a nylon strap which is attached to strap 101 at the same location as snap element 120A. The nylon strap wraps around the outside of handle loop 142. A connector element located on the nylon strap is used to secure the nylon strap to itself, thereby holding the handle loop 142 in a closed position. In alternatives in which handle loop 142 is not formed at the second end of strap 101, snap 120 is not required.

Adjustable stoppers 105 and 106 are located on strap 101, relatively close to the first end of strap 101 (i.e., the end of strap 101 which holds restraining ring 102). In the described embodiment, stoppers 105 and 106 are conventional buckles. The positions of stoppers 105 and 106 can be manually adjusted by feeding strap 101 through stoppers 105 and 106. After stoppers 105–106 have been manually positioned, stoppers 105–106 cannot be moved simply by applying a pulling (or pushing) force along the X-axis. In one embodiment, teeth are formed on one or more of the inner surfaces of stoppers 105–106 (i.e., the surfaces which contact strap 101). These teeth engage with the strap 101, thereby maintaining stoppers 105–106 at fixed positions on strap 101.

In the described embodiment, stoppers 105 and 106 are separated by a distance X3 of approximately 7.5 inches. A section 110 of strap 101 is exposed between stoppers 105 and 106. The significance of stoppers 105–106 and strap section 110 will become apparent in view of the subsequent disclosure.

Figure 4B:
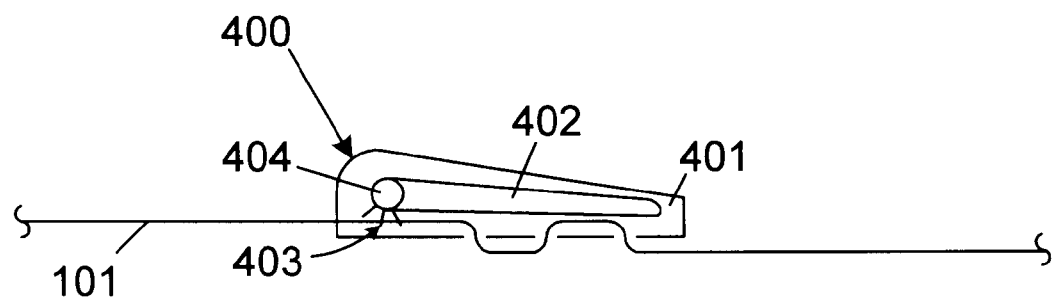

FIGS. 4A and 4B are schematic views of a stopper 400 in open and closed positions, respectively, in accordance with another embodiment of the invention. Stopper 400 includes stopper body 401 and stopper clasp 402. Stopper clasp 402 is pivotally mounted to stopper body 401 at point 404. Teeth 403 extend out from pivot point 404 of stopper clasp 402. While stopper clasp 402 is lifted up (as illustrated in FIG. 4A) strap 101 is threaded through openings 405–407 in stopper body 401. At this time, teeth 403 are lifted out of the way of strap 101. Stopper clasp 402 is then swung down to a closed position, such that teeth 403 are forced into engagement with strap 101 as illustrated in FIG. 4B. Once stopper clasp 402 is the closed position, stopper 400 is fixedly attached to strap 101, and a substantial lifting force is required to disengage the clasp 402.

In one variation, each of stoppers 105 and 106 is replaced with a stopper similar to stopper 400. In this variation, the stoppers are arranged on strap 101 such that the pivot points of the stoppers face each other.

VELCRO™ strips 111 and 112 are located on the first surface 101A of strap 101 (See, FIGS. 1 and 3). In the described embodiment, VELCRO™ strips 111 and 112 are of a first VELCRO™ type (e.g., VELCROT™ hooks). VELCRO™ strip 111 extends from a location near strap fastener 131 to a location near stopper 105. The length of VELCRO™ strip 111 along the X-axis is selected to roughly correspond to the circumference of the neck of the animal to be restrained. In the described embodiment, VELCRO™ strip 111 has a length X2 along the X-axis of approximately 13 inches, a height along the Z-axis of approximately ¾ inches and a thickness along the Y-axis of approximately ¹⁄₁₆ inch.

VELCRO™ strip 112 extends along the X-axis in the positive X direction from a location past stopper 106. In the described embodiment, VELCRO™ strip 112 is separated from stopper 106 by a distance X4 of approximately 2 inches along the X-axis. Like VELCRO™ strip 111, the length of VELCRO™ strip 112 along the X-axis is selected to roughly correspond to the circumference of the neck of the animal to be restrained. Thus, in the described embodiment, VELCRO™ strip 112 has a length X5 along the X-axis of approximately 14 inches, a height along the Z-axis of approximately ¾ inches and a thickness along the Y-axis of approximately 1/16 inch.

VELCRO™ strips 113, 114 and 115 are located on the second surface 101B of strap 101 (See, FIGS. 2 and 3). In the described embodiment, VELCRO™ strips 113, 114 and 115 are of a second VELCRO™ type (e.g., VELCRO™ loops), opposite the first VELCRO™ type. As a result, VELCRO™ strips 113, 114 and 115 are capable of being temporarily attached to VELCRO™ strips 111 and 112 when placed into contact with these strips 111 and 112.

VELCRO™ strip 113 is located at a distance X9 of approximately 22 inches from the first end of strap 101 (i.e., the end of strap 101 which holds restraining ring 102). VELCRO™ strip 113 extends along the X-axis in the positive X direction from a location near stopper 106. The length of VELCRO™ strip 113 along the X-axis is selected to roughly correspond to the circumference of the neck of the animal to be restrained. In the described embodiment, VELCRO™ strip 113 has a length X10 along the X-axis of approximately 13 inches, a height along the Z-axis of ¾ inch and a thickness along the Y-axis of approximately 1/16 inches.

VELCRO™ strip 114 is located at a distance X11 of approximately 7.5 inches from VELCRO™ strip 113 along the X-axis. VELCRO™ strip 114 extends to snap element 120B. VELCRO™ strip 114 has a length X12 along the X-axis of about 11 inches, a height along the Z-axis of ¾ inch and a thickness along the Y-axis of approximately 1/16 inch. VELCRO™ strip 115 extends from snap element 120B to the mid-point of handle loop 142. Thus, VELCRO™ strip 115 has a length X13 of approximately 2.5 inches along the X-axis, a height along the Z-axis of ¾ inch and a thickness along the Y-axis of approximately 1/16 inch. The significance of the positioning and dimensions of the VELCRO™ strips 111–115 will become apparent in view of the subsequent disclosure. In general, VELCRO™ strips 111–115 are positioned such that selected strips will be placed into contact with one another when strap 101 is wrapped in an overlapping spiral configuration.

FIG. 5 is a top view of fully assembled restraint system 100 in an extended state. As illustrated in FIG. 5, restraint system 100 is fully assembled by positioning restraining ring 102 on strap section 110, such that restraining ring 102 encircles strap section 110 between stoppers 105 and 106. The dimensions of strap 101, stoppers 105–106 and restraining ring 102 are selected such that restraining ring 102 moves freely along strap section 110 (along the X-axis), but is prevented from moving past stoppers 105 and 106. Positioning restraining ring 102 on strap section 110 forms a collar loop 143, which is dimensioned to receive the neck of the animal to be restrained.

In one embodiment, restraint system 100 is assembled as follows. First, VELCRO™ strip 111 is sewn onto strap 101. The restraining ring 102 is then secured to the first end of strap 101 as previously described. Stopper 105 is then slid over the second end of strap 101, and positioned on strap 101 as previously described. Restraining ring 102 is then slid over the second end of strap 101. Stopper 106 is then slid over the second end of strap 101, and positioned on strap 101 as previously described. VELCRO™ strips 112–115 are then sewn onto strap 101 and snap 120 is attached to strap 101 as previously described. Tag ring 103 is then slid over the second end of strap 101, and handle loop 142 is then formed as previously described.

Although a particular method of assembling restraint system 100 has been described, the invention is not intended to be limited to this particular method. Other methods would be apparent to one of ordinary skill in the art.

For example, the first step of the method may be to attach all of VELCRO™ strips 111–115 to strap 101. The other elements of restraint system 100 can then be attached to strap 101 in the manner previously described.

Moreover, restraining ring 102 can be a discontinuous ring which may be bent into either an open position or a closed position. Such a restraining ring 102 can be initially bent to an open position, and then slipped over a previously formed strap loop 141. Moreover, such a restraining ring 102 can be bent to an open position and then slipped over section 110 of strap 101, after stoppers 105 and 106 have been positioned on strap 101. After being slipped over loop 141 and/or section 110, the restraining ring 102 is then bent into a closed position, such that the restraining ring 102 surrounds loop 141 and/or section 110. In the foregoing manner, a discontinuous restraining ring 102 provides flexibility in selecting the order of the other assembly steps.

Stoppers 105 and 106 are positioned on strap 101 to provide an appropriate range of circumferences for the collar loop 143. For example, stopper 105 is positioned such that when restraining ring 102 is in contact with stopper 105, collar loop 143 provides a snug fit around the animal's neck. Stopper 106 is positioned such that when restraining ring 102 is in contact with stopper 106, the collar loop 143 provides a loose fit around the animal's neck, but not so loose that collar loop 143 can readily slip over the animal's head.

A first-time positioning of stoppers 105 and 106 is typically required to properly fit collar loop 143 around the animal's neck. However, after this initial fitting, restraint system 100 can remain on the animal at all times.

The operation of restraint system 100 will now be described. As previously mentioned, FIG. 5 illustrates a fully assembled restraint system 100 in an extended state. Restraint system 100 will be in this extended state when the animal is being actively restrained (e.g., when the animal is taken for a walk). While restraint system 100 is in the extended state, the animal owner places a hand into handle loop 142, thereby effectively restraining the animal, which has its neck secured by collar loop 143.

Figure 6:
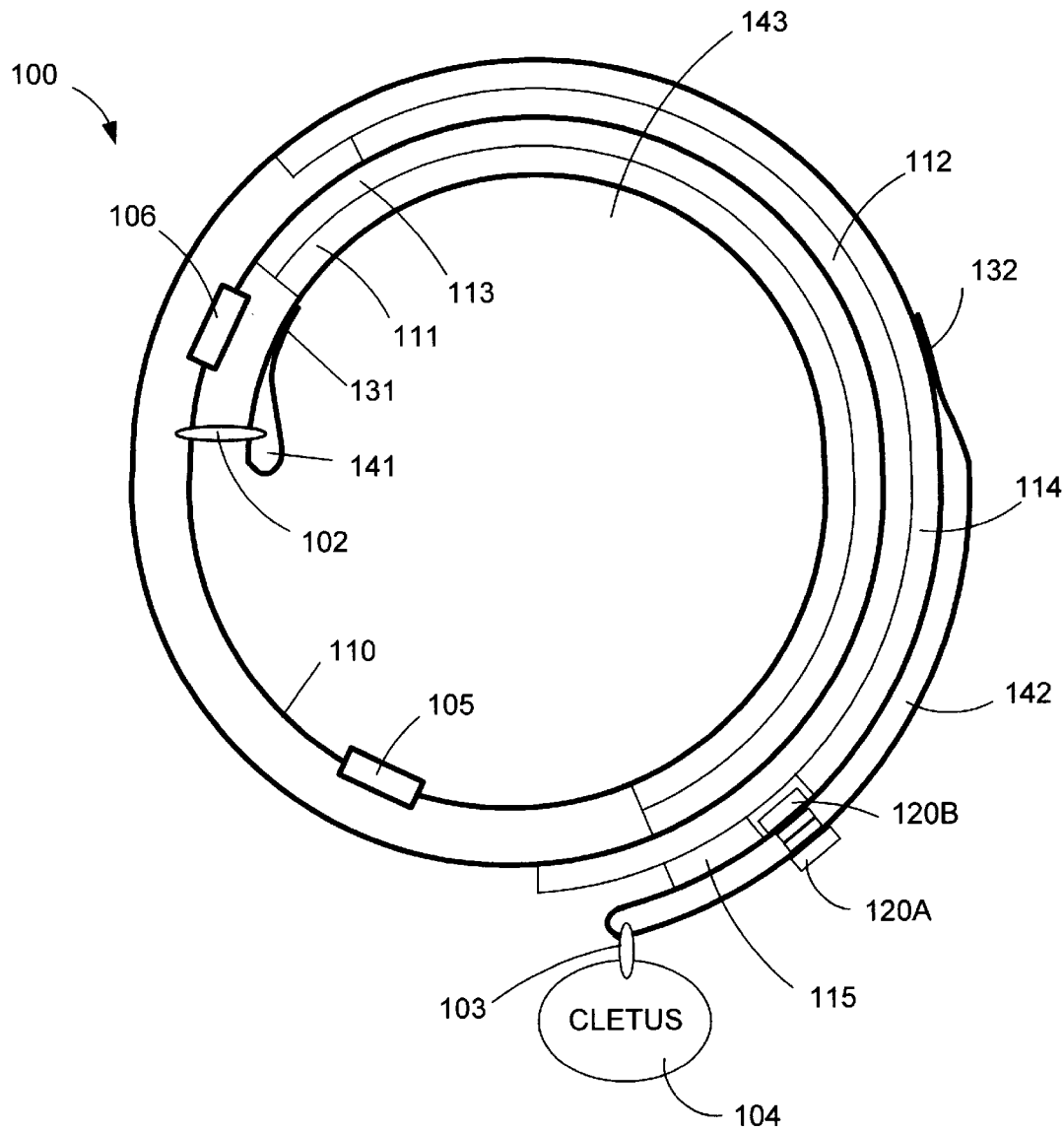
FIG. 6 is a front view of the restraint system of FIG. 5 in a retracted state.

When the animal is not being actively restrained, restraint system 100 is maintained in a retracted state. FIG. 6 is a front view of restraint system 100 in the retracted state. In the retracted state, strap 101 is wrapped around itself in an overlapping spiral configuration, such that VELCRO™ strip 111 is placed into contact with VELCRO™ strip 113, and VELCRO™ strip 112 is placed into contact with VELCRO™ strips 114 and 115. Because VELCRO™ strips 111 and 113 are of opposite types, VELCRO™ strips 111 and 113 are temporarily (i.e., reversibly) attached to one another. Similarly, because VELCRO™ strip 112 is of an opposite type from VELCRO™ strips 114 and 115, VELCRO™ strip 112 is temporarily attached to VELCRO™ strips 114 and 115. The entire strap 101 is thereby stored in an overlapping spiral configuration around the animal's neck. Note that the lengths and positioning of the VELCRO™ strips 111–115 allow strap 101 to be attached to itself along most of its length.

Snap elements 120A and 120B are engaged with one another when the restraint system 100 is in the retracted state. As a result, handle loop 142 is held in a substantially flat, closed configuration. Restraint system 100 thereby maintains a neat appearance while in the retracted state.

While in the retracted state, the animal's identification tag 104 hangs around the animal's neck, suspended from tag ring 103. Thus, restraint system 100 has an appearance similar to a conventional collar while in the retracted state.

In the foregoing manner, the entire restraint system 100 is worn by the animal at all times. This eliminates the possibility of losing a portion of the restraint system. This also reduces the inconvenience to the animal owner, who no longer has to look for a leash each time the animal is to be walked.

Figure 7:
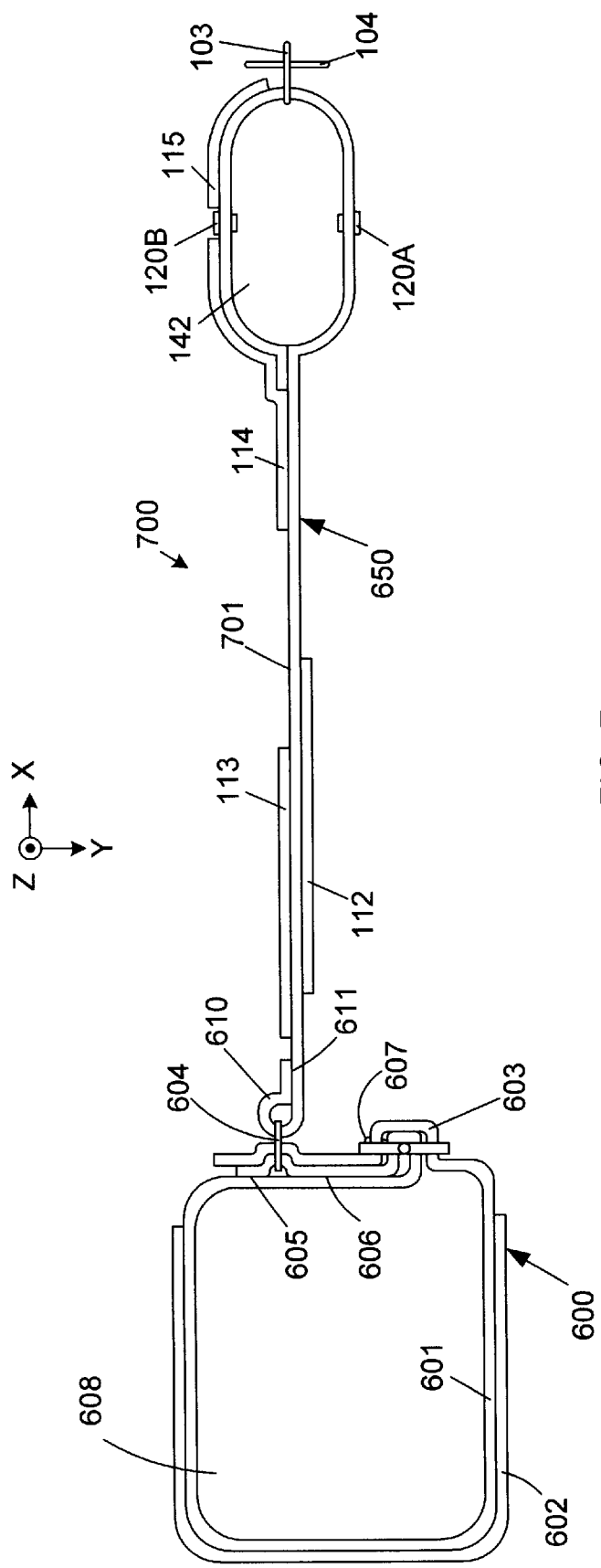
FIG. 7 is a top view of a restraint system in accordance with another embodiment of the present invention.

FIG. 7 is a top view of a restraint system 700 in accordance with an alternative embodiment of the present invention. Restraint system includes collar assembly 600 and leash assembly 650. Collar assembly 600 is similar to a conventional animal restraint collar. Thus, collar assembly 600 includes a collar strap 601, a buckle 603 and a restraining ring 604. Buckle 603 and restraining ring 604 are fixedly attached to collar strap 601 in a manner known in the art. In the illustrated embodiment, collar strap 601 is secured to itself at regions 605 and 606, thereby retaining buckle 603 and restraining ring 604.

Collar strap 601 is secured around the animal's neck in a manner known in the art. In the described example, collar strap 601 includes a series of holes along its length (not shown). Collar strap 601 is threaded through buckle 603 as illustrated. Buckle 603 includes a prong 607 which extends through one of the holes in collar strap 601, thereby fixing the circumference of collar assembly 600. Collar assembly 600 thereby forms a collar loop 608 for receiving the neck of the animal.

In accordance with the present embodiment of the invention, a VELCRO™ strip 602 is attached to the outer surface of the collar strap 601.

Leash assembly 650 is fixedly attached to restraining ring 604 of collar assembly 600. Leash assembly 650 includes elements which are substantially identical to elements previously described in connection with restraint system 100 (FIGS. 1–5). Similar reference characters are therefore used to identify similar elements in FIG. 7 and FIGS. 1–5. Leash assembly 650 therefore includes strap 701, tag ring 103, identification tag 104, VELCRO™ strips 112–115, snap elements 120A–120B, strap fastener 132 and handle loop 142.

Strap loop 610, which is formed at the first end of strap 701, surrounds restraining ring 604, thereby fixedly attaching leash assembly 650 to collar assembly 600. Strap loop 610 is formed by threading the end of strap 701 through restraining ring 604, and then using a strap fastener 611 to secure the first end of strap 701 to the main body of strap 701. Strap fastener 611 can include, for example, thread or a rivet.

Restraint system 700 is illustrated in an extended state in FIG. 7. To place restraint system 700 in a retracted state, the leash assembly 650 is wrapped around the collar assembly 600 (and itself) in an overlapping spiral configuration (See, e.g., FIG. 6). At this time, VELCRO™ strip 601 engages with VELCRO™ strip 113, and VELCRO™ strip 112 engages with VELCRO™ strips 114 and 115. While in the retracted state, restraint system 700 is stored on the animal's neck.

In one variation of the embodiment illustrated in FIG. 7, restraining ring 604 and strap loop 610 are eliminated, and leash strap 701 is directly attached to collar strap 601. In this variation, leash strap 701 can be directly attached to collar strap 601 by sewing these two straps together with nylon thread. Alternatively, leash strap 701 can be directly attached to collar strap 601 with a rivet.

Figure 8:
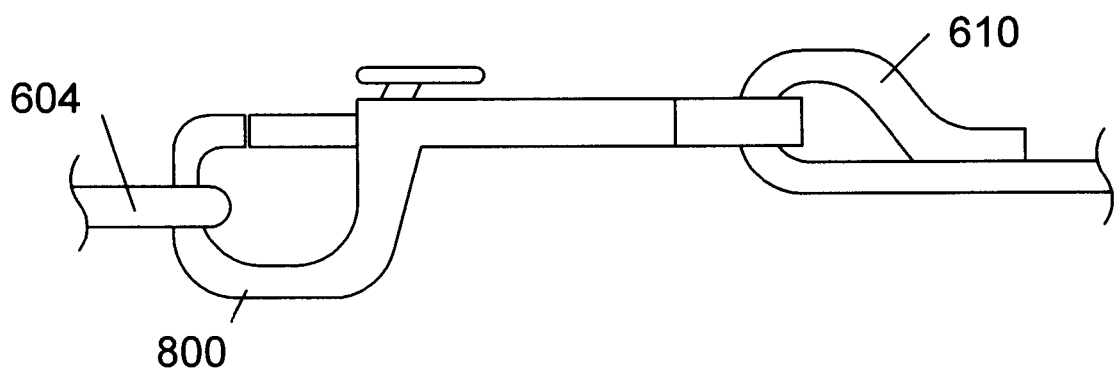
FIG. 8 is a side view of a clasp used in an alternative embodiment of the restraint system of FIG. 7.

In yet another variation of the embodiment illustrated in FIG. 7, strap loop 610 is attached to a conventional clasp or clip, which in turn, can be reversibly attached to restraining ring 604. FIG. 8 illustrates a clasp 800 in accordance with this variation. Clasp 800 can be manually disconnected from restraining ring 604 if desired. In this variation, it is desirable for the clasp or clip to be as small as possible, such that the clasp or clip does not interfere with the wrapping of leash assembly 650.

Although the present invention has been described in connection with particular embodiments, it is to be understood that these embodiments are intended to be illustrative, not limiting. For example, in other embodiments, stoppers 105 and 106 are not used, thereby providing a "choker chain" type of restraint system. In yet other embodiments, the various VELCRO™ strips can be made longer or shorter. For example, strips 113, 114 and 115 can be replaced with a continuous VELCRO™ strip which extends from stopper 106 to the second end of strap 101. Similarly, VELCRO™ strip 112 can be replaced with a VELCRO™ strip which extends from stopper 106 to strap fastener 132. VELCRO™ strip 112 should extend close enough to the second end of strap 101 to engage with VELCRO™ strip 115. However, VELCRO™ strip 112 preferably does not extend so close to the second end of strap 101 as to be exposed when restraint system 100 is in the retracted state. Moreover, other numbers of VELCRO™ strips can be used and are considered within the scope of the present invention. In addition, although collar assembly 600 of restraint system 700 was described as having a buckle 603, it is understood that collar assembly 600 implement other conventional collar designs. For example, buckle 603 can be replaced with an interlocking clip seen in many of today's conventional animal collars. Thus, the invention is defined by the following claims.

We claim:

1. A restraint system for an animal having a neck, the restraint system comprising:

a strap having a first end and a second end and first and second opposing surfaces;

a restraining ring attached at the first end of the strap, wherein the restraining ring is located over the strap to form a collar loop for receiving the neck of the animal;

a first stopper attached to the strap;

a second stopper attached to the strap, wherein the restraining ring is located on the strap between the first and second stoppers, the first and second stoppers restricting movement of the restraining ring along the strap; and hook and loop fastener strips located on the first and second opposing surfaces of the strap, wherein the strips are positioned to engage with one another when the strap is wrapped around itself in a spiral configuration.

2. The restraint system of claim 1, further comprising a handle loop formed at the second end of the strap.

3. The restraint system of claim 2, further comprising a fastener for holding the handle loop in a closed configuration.

4. The restraint system of claim 3, wherein the fastener comprises a snap.

5. The restraint system of claim 3, wherein the fastener comprises at least two hook and loop fastener strips.

6. The restraint system of claim 1, wherein the first and second stoppers are adjustable along the strap.

7. The restraint system of claim 1, wherein the hook and loop fastener strips comprise:
- a first hook and loop fastener strip on the first surface of the strap, wherein the first hook and loop fastener strip is of a first type; and
- a second hook and loop fastener strip on the second surface of the strap, wherein the second hook and loop fastener strip is of a second type which reversibly engages with the first type.

* * * * *

UNITED STATES PATENT AND TRADEMARK OFFICE
CERTIFICATE OF CORRECTION

PATENT NO. : 5,947,062
DATED : Sept. 7, 1999
INVENTOR(S) : Michael C. Hoffman

It is certified that error appears in the above-identified patent and that said Letters Patent is hereby corrected as shown below:

Title page, item [19] delete et al. And delete inventor E. Eric Hoffman in item [76].

Signed and Sealed this

Twenty-first Day of March, 2000

*Attest:*

Q. TODD DICKINSON

*Attesting Officer*  *Commissioner of Patents and Trademarks*